(12) United States Patent
Claycomb et al.

(10) Patent No.: US 9,696,872 B2
(45) Date of Patent: Jul. 4, 2017

(54) TREEMAP PERSPECTIVE MANIPULATION

(71) Applicant: International Business Machines Corporation, Armonk, NY (US)

(72) Inventors: Matthew R. Claycomb, Lincoln, NE (US); Trenton J. Johnson, Columbia, SC (US); James L. Lentz, Austin, TX (US); Dana L. Price, Cary, NC (US); Charmant K. Tan, Atlanta, GA (US); Ramratan Vennam, Colfax, NC (US)

(73) Assignee: International Business Machines Corporation, Armonk, NY (US)

( * ) Notice: Subject to any disclaimer, the term of this patent is extended or adjusted under 35 U.S.C. 154(b) by 225 days.

(21) Appl. No.: 13/899,185

(22) Filed: May 21, 2013

(65) Prior Publication Data
US 2014/0351730 A1    Nov. 27, 2014

(51) Int. Cl.
*G06F 3/048* (2013.01)
*G06F 3/0482* (2013.01)
*G06F 3/0486* (2013.01)
*G06F 3/0481* (2013.01)
*G06F 17/30* (2006.01)
(Continued)

(52) U.S. Cl.
CPC .......... *G06F 3/0482* (2013.01); *G06F 3/0481* (2013.01); *G06F 3/0486* (2013.01); *G06F 3/04883* (2013.01); *G06F 8/38* (2013.01); *G06F 9/4443* (2013.01); *G06F 17/30389* (2013.01); *G06F 17/30477* (2013.01); *G06F 17/30554* (2013.01); *G06F 17/30598* (2013.01); *G06F 17/30961* (2013.01); *G06Q 30/02* (2013.01); *G06Q 30/0251* (2013.01); *G06T 11/206* (2013.01)

(58) Field of Classification Search
CPC ................. G06F 3/0486; G06F 3/0481; G06F 17/30554; G06F 17/30598; G06F 17/30477; G06F 17/30389; G06F 9/4443; G06F 8/38; G06F 17/30961; G06Q 30/0251; G06Q 30/02; G06Q 30/0204; G06T 11/206
USPC .................................................. 715/769, 762
See application file for complete search history.

(56) References Cited

U.S. PATENT DOCUMENTS

| 6,055,515 A | 4/2000 | Consentino et al. |
| 7,689,570 B2 | 3/2010 | Fuchs |

(Continued)

OTHER PUBLICATIONS

TreeMap v. 3.7.2 by Macrofocus 2005, screenshots from working program, pp. 1-7.*

(Continued)

*Primary Examiner* — Patrick Riegler
*Assistant Examiner* — Alex Olshannikov
(74) *Attorney, Agent, or Firm* — Lieberman & Brandsdorfer, LLC (57) ABSTRACT

Dynamic display of hierarchical data in the form of a treemap. A first instance of an object representation is selected in a first visualization of a hierarchy encoded by containment. A second instance of the object representation is designated, wherein each instance is a tier for object occupation. An object within the hierarchy is displayed as a shape comprising at least two opposing surfaces, and the object is selected through the opposing surfaces. The hierarchy is dynamically re-ordered in response to the selection and designation, and the second representation of the hierarchy is displayed based on the dynamic re-ordering.

17 Claims, 11 Drawing Sheets

(51) Int. Cl.
*G06F 9/44* (2006.01)
*G06Q 30/02* (2012.01)
*G06T 11/20* (2006.01)
*G06F 3/0488* (2013.01)

(56) References Cited

U.S. PATENT DOCUMENTS

| | | | |
|---|---|---|---|
| 8,856,675 B1* | 10/2014 | Agarawala | G06F 3/048 |
| | | | 715/777 |
| 2006/0143205 A1* | 6/2006 | Fuchs | 707/101 |
| 2010/0169853 A1* | 7/2010 | Jain et al. | 716/5 |
| 2010/0235725 A1 | 9/2010 | Drayton et al. | |
| 2011/0016432 A1 | 1/2011 | Helfman | |
| 2011/0225548 A1* | 9/2011 | Callens et al. | 715/835 |
| 2011/0304560 A1 | 12/2011 | Dale et al. | |
| 2012/0317518 A1* | 12/2012 | Wittig et al. | 715/853 |
| 2013/0086022 A1* | 4/2013 | Black, III | G11B 27/36 |
| | | | 707/705 |

OTHER PUBLICATIONS

"Treemap Guide", webpage, Oct. 7, 2012.
Bruls, Mark et al., "Squarified Treemaps", Proceedings of the Joint Eurographics and IEEE TVCG Symposium on Visualization, 1999, pp. 33-42.
Shneiderman, Ben, "Tree Visualization with Tree-Maps: 2-d Space-Filling Approach", ACM Transactions on Graphics, vol. 11, No. 1, Jan. 1992, pp. 92-99.

* cited by examiner

TREEMAP PERSPECTIVE MANIPULATION

BACKGROUND

Technical Field

The present invention relates generally to graphically visualizing and manipulating hierarchical data. More specifically, the invention relates to providing modifying perspective of the data through interactive re-organization of the hierarchy.

Background

A tree map is a graphical technique representing data through a nested hierarchy. Specifically, the tree map is a visualization technique that enables users to efficiently discover relationships in complex datasets. Tree maps present data in a hierarchical containment fashion that groups objects within objects. The data may include non-hierarchical relationships, but the visualization is strictly hierarchical, e.g. the data can be described by multiple hierarchical relationships, one at a time. Relationships are visualized by dynamically reordering the display to represent different views.

While tree mapping is useful in presenting data in a hierarchical order, sometimes the order in which the data is presented might require adjustment to display different viewpoints within the data. A technique developed to address this issue includes a recordable linear list of attributes in the display that are reorganized by dragging attributes to different positions. However, this solution requires that re-organization controls are displayed separately from an associated display. In this solution, additional real estate on an associated visual display is required. When performing a re-organization operation, focus is placed on a list of attributes rather than on the display, and cognitive effort must be expended when mapping the linear list of attributes to the containment relation in the mapping.

SUMMARY OF THE INVENTION

This invention comprises a system and computer program product for manipulating the display of graphical data.

In one aspect, a computer program product is provided to support graphical display of hierarchical data. The computer program product is in communication with a computer-readable non-transitory storage device having computer readable program code embodied therewith. When executed, a first instance of an object representation in the hierarchy is selected, and a tier within the hierarchy for the object is designated. An object within the hierarchy is displayed as a shape. Selection of the object includes selecting an element as defined by the shape. In response to the selection and designation of the object, the hierarchy is dynamically re-ordered. Specifically, the computer applies the selection across an entirety of the hierarchy, and a second representation of the hierarchy different from the first representation of the hierarchy is created. The second representation is based on the dynamic re-ordering of the hierarchy.

In another aspect, a system is provided for graphically displayed hierarchical data. A selection manager selects a first instance of an object representation displayed by a first visualization. The object is displayed within the hierarchy as a shape, and selection of the object includes selection of an element as defined by the shape. A designation manager is provided to designate a second instance of the object representation in response to the selection. The second instance is a tier within the hierarchy for the object. A representation manager is provided to dynamically re-order the hierarchy in response to the designation by applying the selection across the hierarchy, and creates a second representation of the hierarchy different than the first representation.

Other features and advantages of this invention will become apparent from the following detailed description of the presently preferred embodiment of the invention, taken in conjunction with the accompanying drawings.

BRIEF DESCRIPTION OF THE DRAWINGS

The drawings referenced herein form a part of the specification. Features shown in the drawings are meant as illustrative of only some embodiments of the invention, and not of all embodiments of the invention unless otherwise explicitly indicated. Implications to the contrary are otherwise not to be made.

DETAILED DESCRIPTION

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional unit described in this specification has been labeled with tools, modules, and/or managers. The functional unit may be implemented in programmable hardware devices such as field programmable gate arrays, programmable array logic, programmable logic devices, or the like. The functional unit may also be implemented in software for execution by various types of processors. An identified functional unit of executable code may, for instance, comprise one or more physical or logical blocks of computer instructions which may, for instance, be organized as an object, procedure, function, or other construct. Nevertheless, the executable of an identified functional unit need not be physically located together, but may comprise disparate instructions stored in different locations which, when joined logically together, comprise the functional unit and achieve the stated purpose of the functional unit.

Indeed, a functional unit of executable code could be a single instruction, or many instructions, and may even be distributed over several different code segments, among different applications, and across several memory devices. Similarly, operational data may be identified and illustrated herein within the functional unit, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of managers, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

In the following description of the embodiments, reference is made to the accompanying drawings that form a part hereof, and which shows by way of illustration the specific embodiment in which the invention may be practiced. It is to be understood that other embodiments may be utilized because structural changes may be made without departing from the scope of the present invention.

Figure 1:
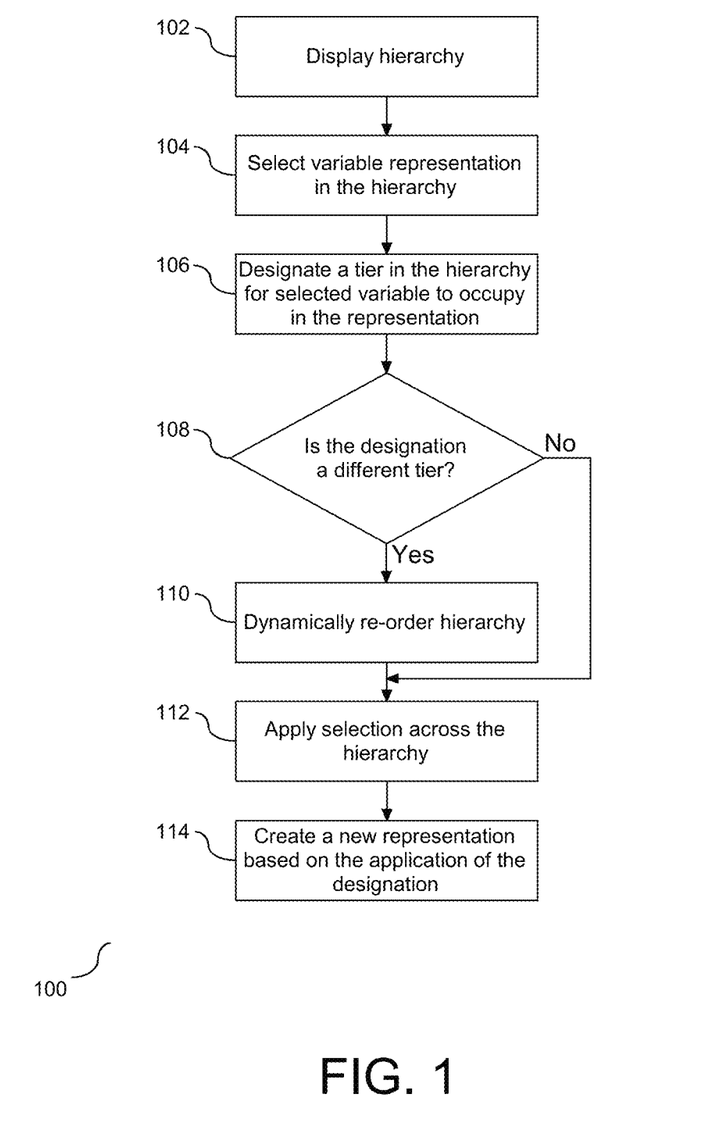
FIG. 1 is a flow chart illustrating a method for a dynamic hierarchical display.

For flexibility in adjustment of displayed hierarchical data, a dynamic hierarchical representation with selectable and movable variables, also referred to herein as objects, is enabled. FIG. 1 is a flow chart (100) illustrating a method for dynamically re-ordering an object representation within a hierarchical visualization. In the displayed hierarchy (102), an object is displayed as a representation of the designated tier and is displayed within the hierarchy as a shape, e.g. defined by containment of the properties of the shape. The object represented within the hierarchy is selected (104) and a tier for the object to occupy within the hierarchical representation is designated (106). Following step (106), it is determined in the designation if the selected object includes a different tier in the hierarchy (108). If the designation is determined to include a change of tiers within the hierarchy for the selected object, the hierarchy is dynamically re-ordered (110). Following step (110) or a negative response to the determination at step (108), the selection is applied across the entire hierarchy (112). More specifically, the application across the hierarchy includes moving all objects that were originally within the tier of the selected object to the changed tier. Accordingly, application of the tier change creates and a new representation of the objects based on application of the designation (114).

In one embodiment, the order of designated tiers in the hierarchy is adjusted on an associated visual display responsive to the selected object designation. For example, a variable may be selected from a second tier and designated to a third tier. The hierarchy is adjusted such that on the display, the third tier takes the place of the second tier and the second tier takes the place of the third tier. Accordingly, the hierarchical visualization is dynamically adjusted in response to an object selection and designation within the hierarchy.

Figure 2:
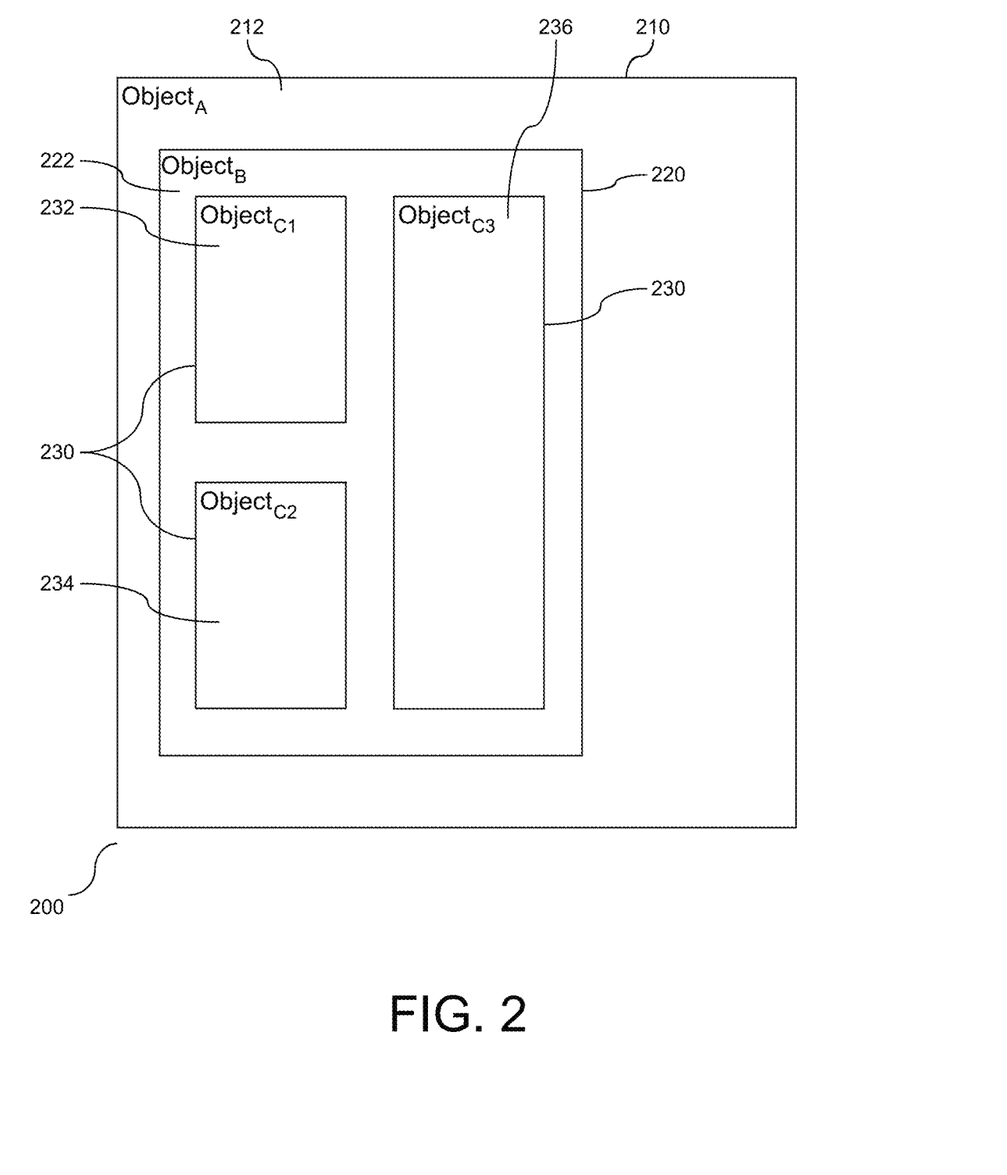
FIG. 2 depicts a block diagram for a representative hierarchical display.

FIG. 2 is a block diagram (200) illustrating an example of a display of hierarchical data with three tiers in the hierarchy. The hierarchy display includes objects nested at various tiers within the displayed hierarchy. Specifically, $tier_1$ (210) is represented by a single object, $object_A$ (212), and is designated in the example as the outer most tier. Although one object is shown represented in $tier_1$ (210), in one embodiment two or more objects may be represented in $tier_1$ (210). $Tier_2$ (220) is also represented with a single object, $object_B$ (222), which is nested within $object_A$ (212). Although only one object is shown represented in $tier_2$ (220), in one embodiment two or more objects may be represented in $tier_2$ (220). $Tier_3$ (230) is represented with three objects, shown as $object_{C1}$ (232), $object_{C2}$ (234), and $object_{C3}$ (236). Each of the objects in $tier_3$ (230) are nested within $tier_2$ (220). Although three objects are shown and described in $tier_3$ (230), in one embodiment any number of objects may be represented, and, the invention should not be limited to the quantity of objects shown. Similarly, while three hierarchical tiers are shown in this instance of the hierarchy, it should be understood that the hierarchy may display any number of tiers, and the invention should not be limited to the quantity of illustrated tiers. Additionally, in this instance each variable is depicted in the form of a rectangle, however any shape may be utilized for variable representation as long as each shape area that denotes a tier level is fully partitioned to show the next lower level, e.g. the tree map cannot have any empty spaces. Accordingly, a hierarchy is displayed with a plurality of nested tiers, each tier being in the form of one or more objects.

Figure 3:
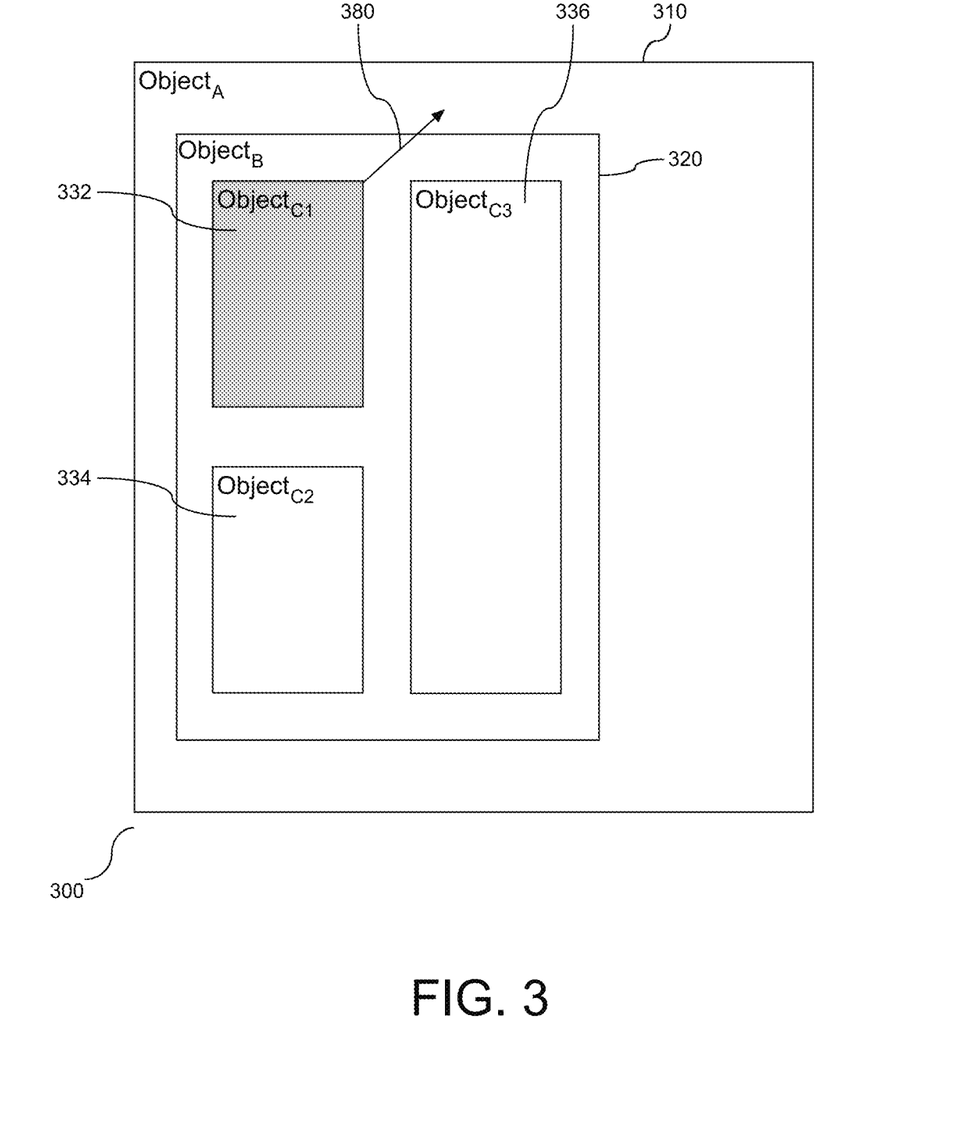
FIG. 3 depicts a block diagram illustrating one embodiment for selection and designation of an object.

A displayed hierarchy of data in nested tiers represented as objects is generally known as a tree-map. A tree-map is a powerful tool for the visualization of data, even in data having non-hierarchical relationships. To increase the efficacy and interactive tree-mapping environment, a dynamic aspect is included within the display. Specifically, the tree-mapping environment is utilized such that objects may be selected and moved among the represented tiers, and the displayed hierarchy is re-ordered responsive to these selections. FIG. 3 is a block diagram (300) depicting an object selection and tier designation in the displayed hierarchy based upon the hierarchical display of the tiers shown and described in FIG. 2.

As described in FIG. 2, $object_{C1}$ (330) initially resides in $tier_3$. $Object_{C1}$ (332) is shown with shaded indicia to illustrate that $object_{C1}$ (332) is a selected object. The selection of a different tier designation for $object_{C1}$ (332) is shown by arrow (380). Specifically, arrow (380) is shown to designate $tier_2$ (320). The designation of $object_{C1}$ (332) to $tier_2$ (320) causes $tier_2$ (320) and $tier_3$ (330) to swap positions in the hierarchy. Dragging, or otherwise moving, an instance of a variable in one tier into another tier tells the system to swap each of the objects between the two tiers. This re-ordering of tiers is propagated throughout the entire hierarchy. Accordingly, the designation of a different tier for a select object re-orders all of the objects in the originating tier and the designated tier.

Figure 4:
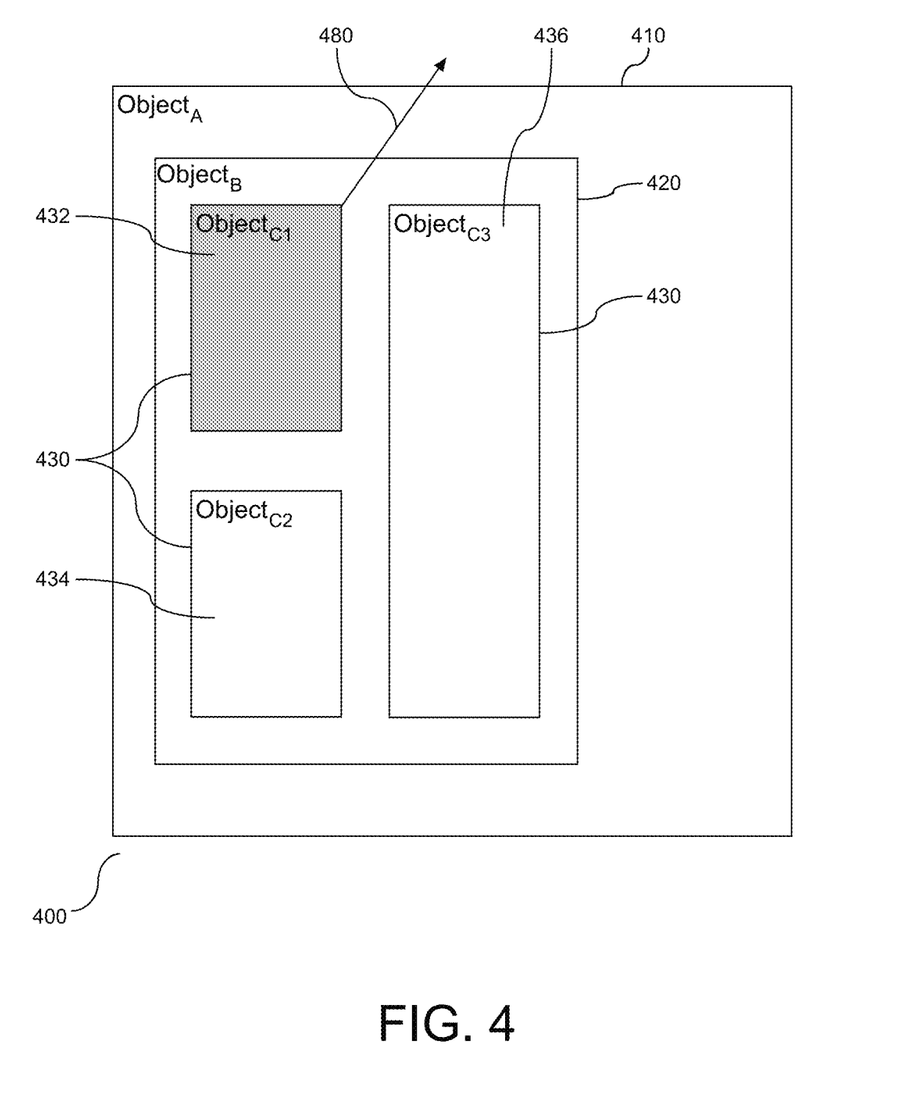
FIG. 4 depicts a block diagram illustrating one embodiment for selection and designation of an object.

FIG. 4 is a block diagram (400) depicting an object selection and tier designation in the displayed hierarchy based on the hierarchical display of the tiers shown and described in FIG. 2. Object$_{C1}$ (432) is shown with shaded indicia to illustrate that object-$_{C1}$ (432) is a selected variable. As shown, object$_{C1}$ initially resides in tier$_3$ (430). A selection of a new tier for object$_{C1}$ (432) is shown by arrow (480). Specifically, the arrow (480) is shown to designate an area outside of the hierarchical representation indicating designation of tier$_1$ (410). Tier$_1$ (410) is designated because it is the outermost tier in the representation. Designation of object$_{C1}$ (432) to tier$_1$ (410) causes the objects represented in tier$_1$ and tier$_3$ to swap positions in the hierarchy. Re-ordering of the objects is propagated throughout the hierarchy. Accordingly, the designation of a different tier for a select object re-orders all of the variables in the originating tier and the designated tier thereby providing a changed representation of the objects in the hierarchy.

Figure 5:
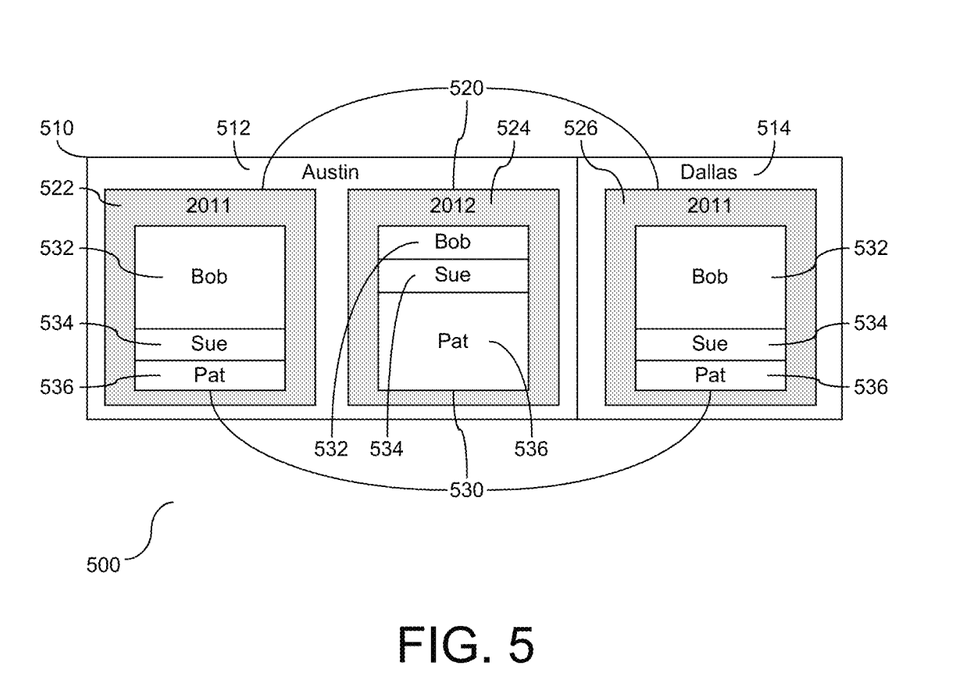
FIG. 5 depicts a block diagram illustrating a hierarchical display of objects.

Any number of methods may be implemented for selecting an object and designating a respective tier in the hierarchy. FIG. 5 is a block diagram (500) illustrating one such method. More specifically, FIG. 5 shows a treemap with three tiers (510), (520), and (530). The parent tier (510), tier$_1$, is shown with two objects (512) and (514). The child tier (520), tier$_2$, is shown with two objects (522) and (524) nested within object (512), and with one object (526) nested within object (514). The grandchild tier (530), tier$_3$, is shown with three objects (532), (534), and (536). Any one of the tiers may be selected with a pointing device, such as a stylus, or an alternative selection element.

Figure 5A:
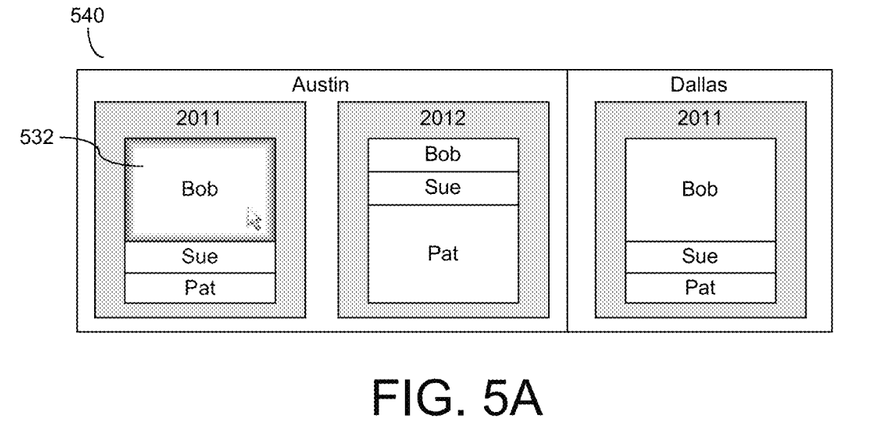
FIGS. 5A-5F depicts the reordering of the objects of the block diagram of FIG. 5 through one embodiment of object selection.
Figure 5B:
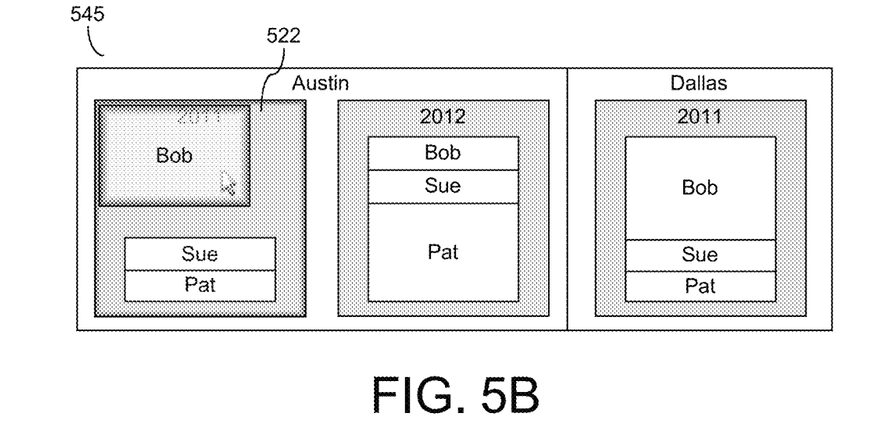
Figure 5C:
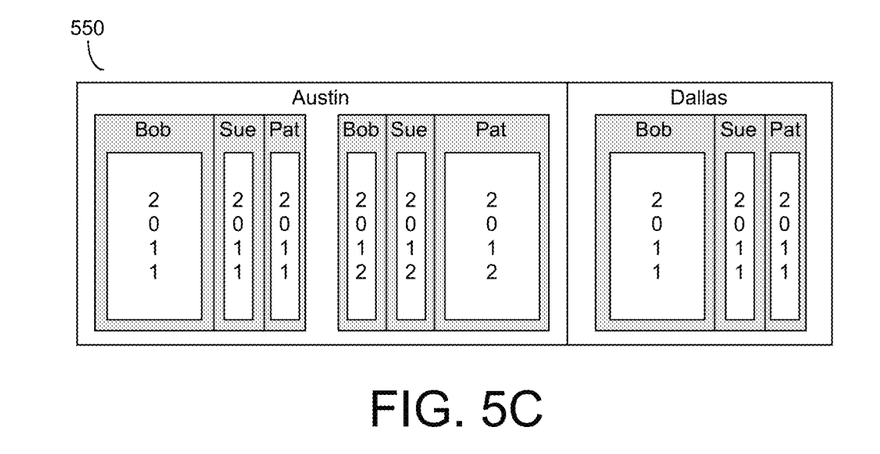

FIG. 5A is a block diagram (540) showing all of the tiers and objects shown in FIG. 5, with object (532) in tier$_3$ (530) selected, followed by selection of object (522) in tier$_2$ (520) shown in FIG. 5B (545). These selections move all of the objects (532), (534), and (536) originally in tier$_3$ (530) to tier$_2$ (520), and at the same time moves all of the objects (522) and (524) originally in tier$_2$ (520) to tier$_3$ (530). FIG. 5C is a block diagram (550) of the treemap with movement of the objects shown and described in FIGS. 5A and 5B.

Figure 5D:
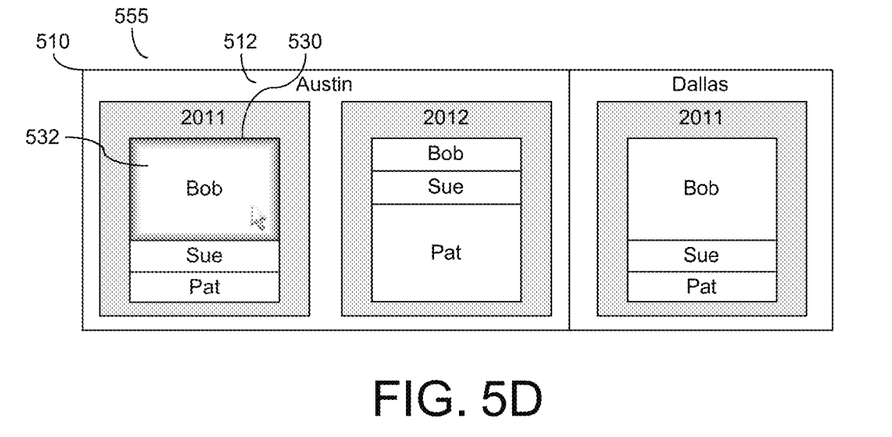
Figure 5E:
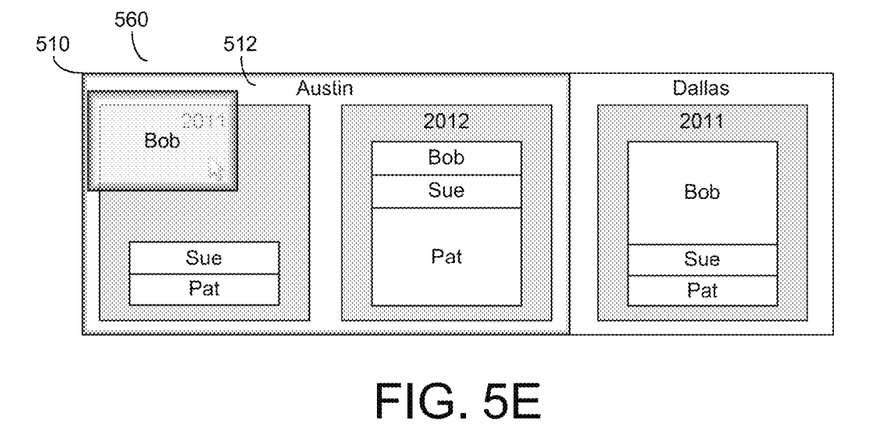
Figure 5F:
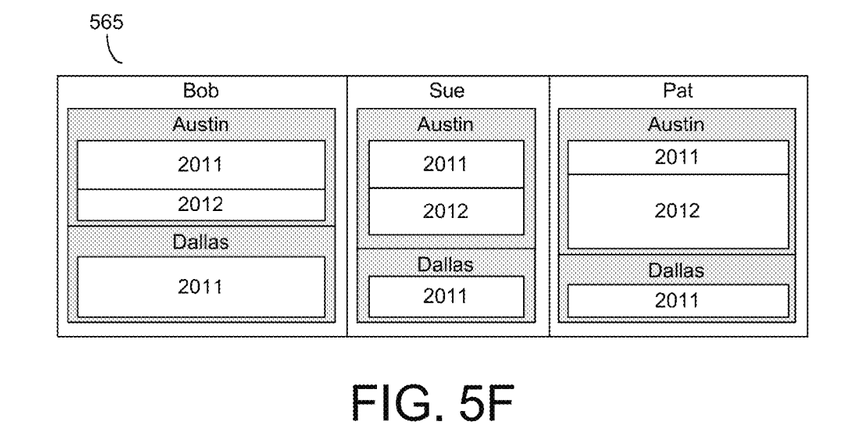

FIG. 5D is a block diagram (555) showing all of the tiers and objects shown in FIG. 5, with object (532) in tier$_3$ (530) selected, followed by selection of object (512) in tier$_1$ (510) shown in FIG. 5E (560). These selections move all of the objects (532), (534), and (536) originally in tier$_3$ (530) to tier$_1$ (510), and at the same time moves all of the objects (512) and (514) originally in tier$_1$ (510) to tier$_3$ (530). FIG. 5F is a block diagram (565) of the treemap with movement of the objects shown and described in FIGS. 5D and 5E. As shown, responsive to the selection of an object and a tier, the tiers as represented by their objects switch positions, and the changes are propagated throughout the hierarchy of the treemap. Accordingly, an object may be selected and designated through selection of the object followed by selection of a tier within a graphical representation of the treemap.

Figure 6A:
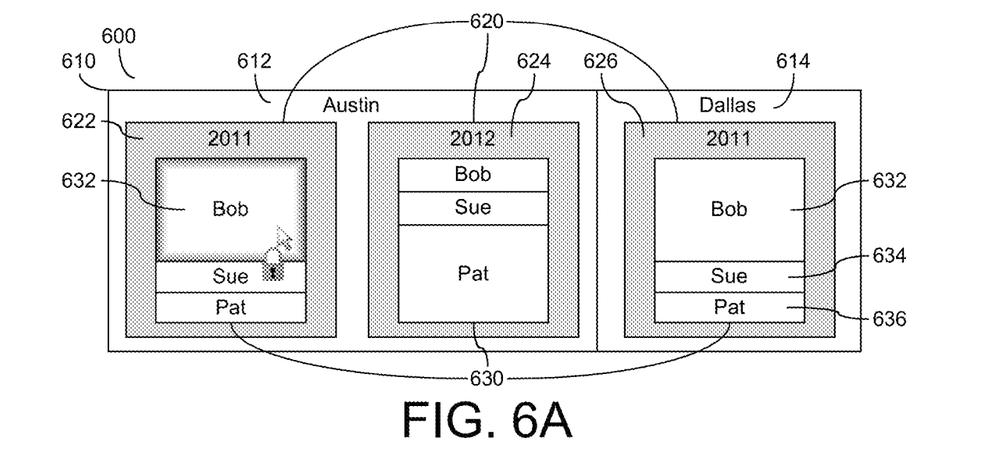
FIGS. 6A-6F depicts the reordering of the objects of the block diagram of FIG. 5 through another embodiment of object selection.
Figure 6B:
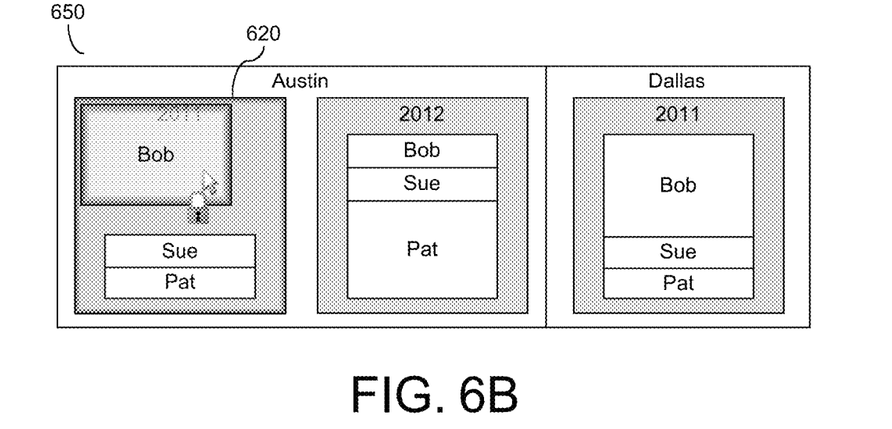
Figure 6C:
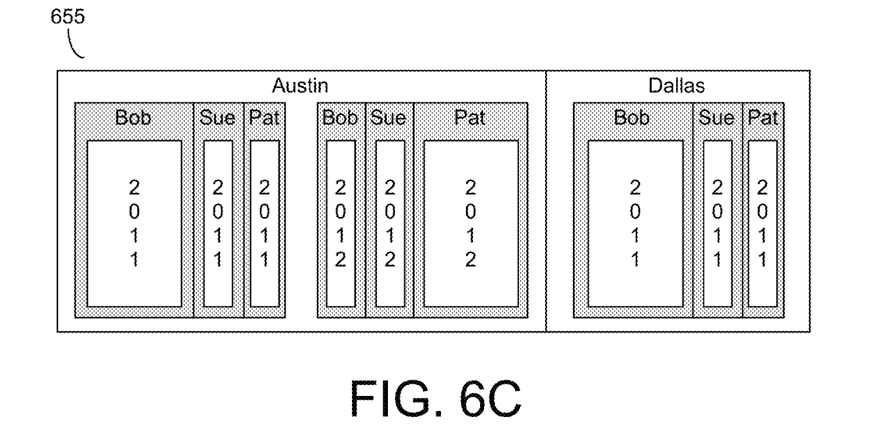

FIG. 6A is block diagram (600) illustrating an additional method for manipulation of objects and tiers of a treemap. As in FIG. 5, FIG. 6A is a treemap (600) with three tiers (610), (620), and (630). The parent tier (610), tier$_1$, is shown with two objects (612) and (614). The child tier (620), tier$_2$, is shown with two objects (622) and (624) nested within object (612), and with one object (626) nested within object (614). The grandchild tier (630), tier$_3$ (630), is shown with three objects (632), (634), and (636). Any one of the tiers may be selected with a gesture. In FIG. 6A one of the instances of object (632) in tier$_3$ (630) is selected through a gesture of touching and holding the object (632). Once the gesture is completed the object (632) is highlighted to indicate selection thereof. Any one of the objects in tier$_2$ (620) or tier$_1$ (610) may be selected through a gesture for movement of the objects in and re-ordering of the tiers of the treemap. FIG. 6B is a block diagram (650) showing selection of tier$_2$ (620) through a gesture of dragging selected object (632) toward the border of tier$_2$ (620). Upon release of selected object (632), e.g. through removing the gesture off of object (622), the treemap is reordered. FIG. 6C is a block diagram (655) showing the reordering of the tiers of the treemap upon release of the gesture. Specifically, the objects in tier$_2$ (620) and tier$_3$ (630) swap positions in the hierarchy.

Figure 6D:
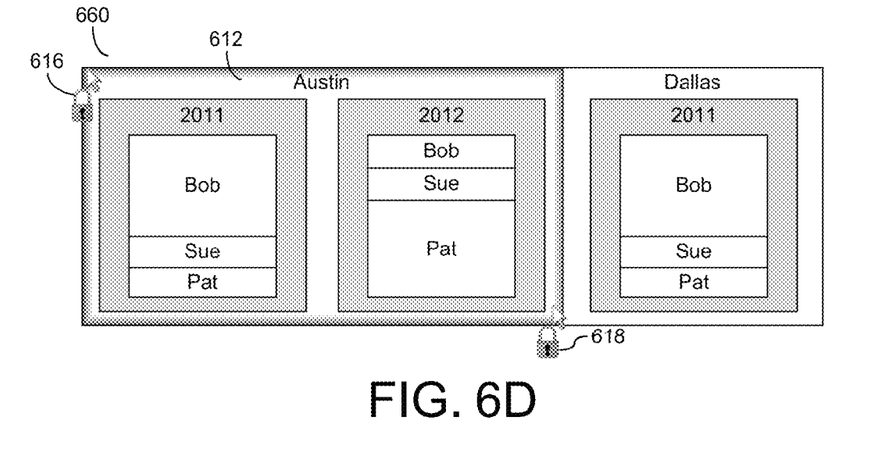
Figure 6E:
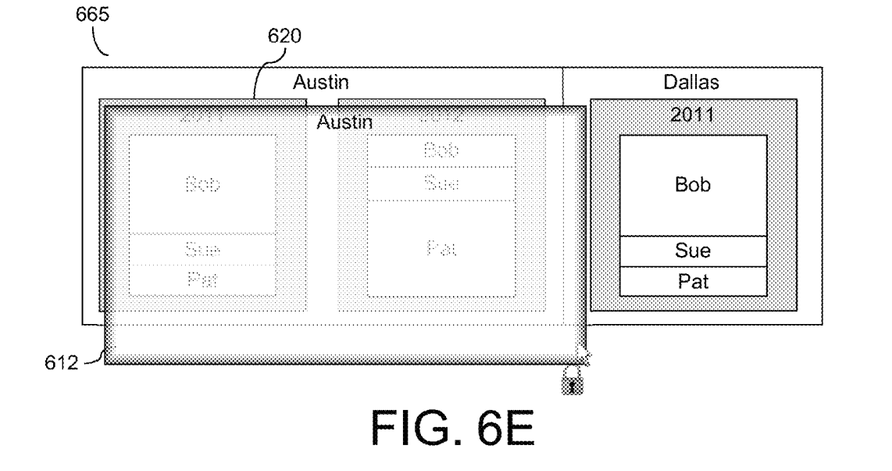
Figure 6F:
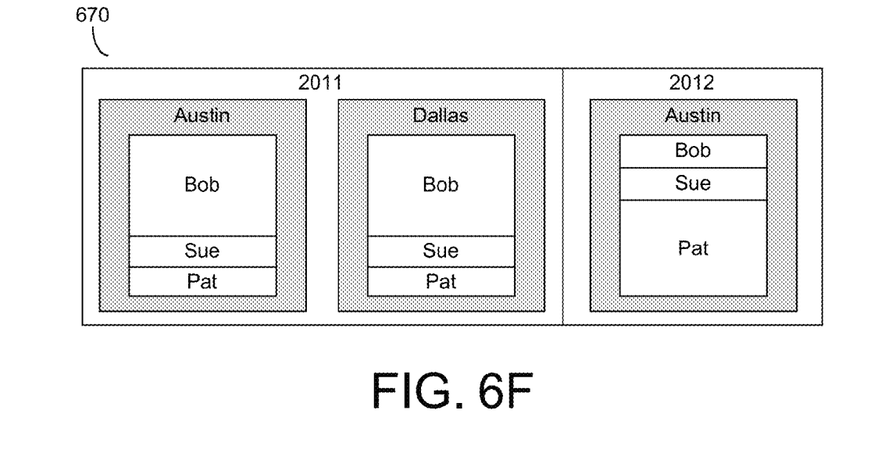

FIG. 6D is block diagram (660) illustrating an additional method for manipulation of objects and tiers of a treemap. In FIG. 6D object (612) in tier$_1$ (610) is selected through a gesture of touching opposite surfaces (616) and (618) of one instance of object (612). Once the gesture is completed, the object (612) is highlighted to indicate selection thereof. Any one of the objects in tier$_2$ (620) or tier$_3$ (630) may be selected through a gesture for movement of the selected object (612). FIG. 6E is a block diagram (665) showing selection of tier$_2$ (620) through a gesture of dragging selected object (612) toward one of the objects in tier$_2$ (620). In one embodiment, dragging of the selected object (612) requires only a single gesture, e.g. one finger may be released from the interface. Upon release of selected object (612), e.g. through removing the gesture off of object (612), the treemap is reordered. FIG. 6F is a block diagram (670) showing the reordering of the tiers of the treemap upon release of the gesture. Specifically, the objects in tier$_1$ (610) and tier$_2$ (620) swap positions in the hierarchy. Accordingly, as shown any unambiguous marking of a tier could be used to select it for the reordering operation as long as only one tier is contacted.

As will be appreciated by one skilled in the art, aspects of the present invention may be embodied as a system, method or computer program product. Accordingly, aspects of the present invention may take the form of an entirely hardware based embodiment, an entirely software based embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
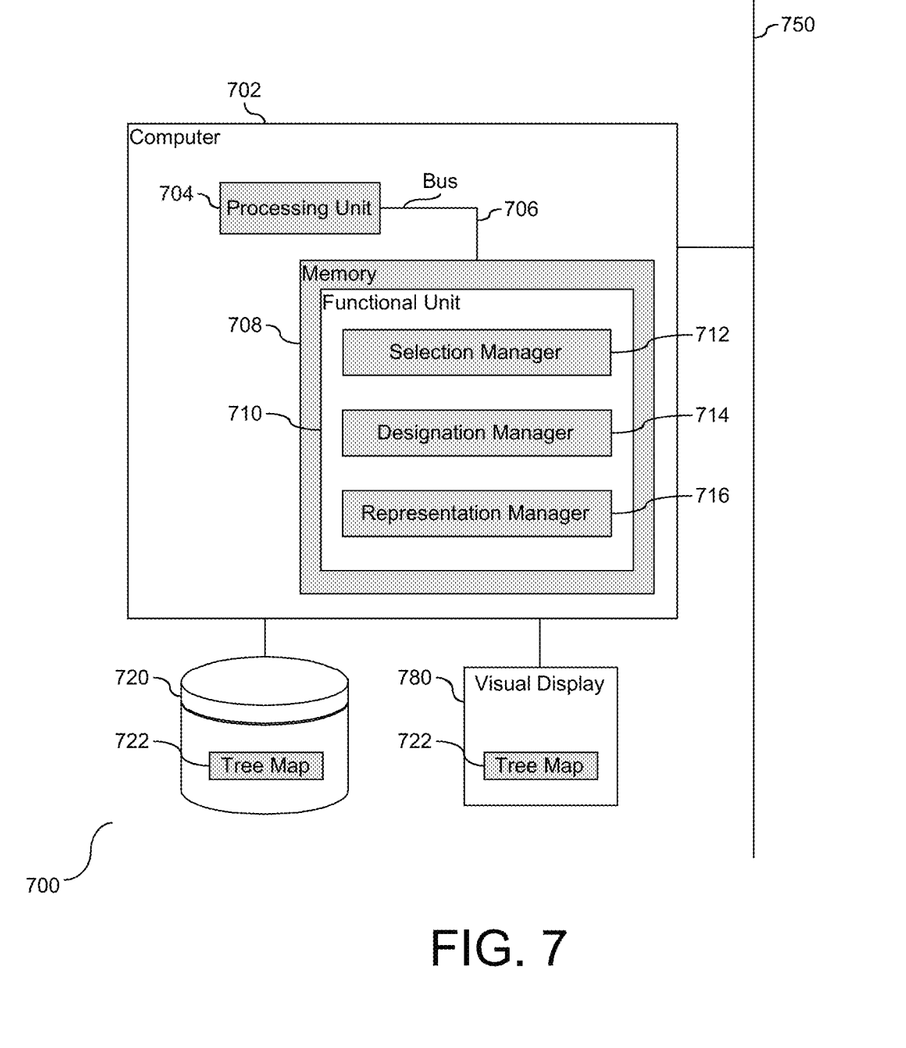
FIG. 7 depicts a block diagram showing a system for dynamic selection and reordering of hierarchical data.

FIG. 7 illustrates a system (700) for hierarchical representation of data and for a dynamic re-ordering of the representation. A computer (702) is provided in communication with data storage (720). The computer (702) includes a processing unit (704) in communication with memory (708) across a bus (706). The data represented in the tree map and the program logic to render it on a display device may be stored on local data storage (720), or in one embodiment may be available through remote data storage (not shown) available across a network (750). A visual display (780) is shown in communication with the computer (702) and may be employed to provide a visualization of the tree map (722).

A functional unit (710) is provided embedded in memory (708), and includes tools to support functionality associated with the hierarchical representation. The tools include, but are not limited to, a selection manager (712), a designation manager (714), and a representation manager (716). The selection manager (712) supports and enables selection of a first instance of a representative object in a hierarchy encoded by a hierarchical containment. In one embodiment, the representative object is displayed as a shape in the hierarchy. In one embodiment, the object is selected through selection of two opposing surfaces of the object. Selection of the first object by the selection manager (712) includes the selection manager moving at least one of the attributes of the selected object within the hierarchy from a first physical position in the hierarchy to a second physical position in the hierarchy. The designation manager (714) designates a second position within the hierarchy for the selected object to occupy. In one embodiment, the designation of the object takes place in a single action. In one embodiment, this action includes dragging the object to a designation tier in the hierarchy. Accordingly, the selection manager (712) selects an object, and the designation manager (714) designates a tier to which the object is moved.

In order to present the object move on the display, the representation is applied across the hierarchy. The representation manager (716) dynamically re-orders the hierarchical display in response to the designation. In one embodiment, the hierarchy is re-ordered such that the selection and designation of the object is applied across the entire hierarchy. The representation manager (716) re-orders the hierarchy and displays a second representation of the hierarchy that is different than the first representation of the hierarchy. Similarly, for an intra-tier designation, the representation manager (716) creates a new representation based on the designation. The displayed second representation is responsive to the designation and/or re-ordering. Accordingly, the representation is displayed responsive to the selection and designation of the representative object.

Furthermore, the described features, structures, or characteristics may be combined in any suitable manner in one or more embodiments. Examples of the managers have been provided to lend a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The functional unit described above in FIG. 7 has been labeled with managers. The managers may be implemented in programmable hardware devices such as field programmable gate arrays, programmable array logic, programmable logic devices, or the like. The manager(s) may also be implemented in software for processing by various types of processors. An identified manager of executable code may, for instance, comprise one or more physical or logical blocks of computer instructions which may, for instance, be organized as an object, procedure, function, or other construct. Nevertheless, the executable of an identified manager need not be physically located together, but may comprise disparate instructions stored in different locations which, when joined logically together, comprise the managers and achieve the stated purpose of the managers.

Indeed, a manager of executable code could be a single instruction, or many instructions, and may even be distributed over several different code segments, among different applications, and across several memory devices. Similarly, operational data may be identified and illustrated herein within the manager, and may be embodied in any suitable form and organized within any suitable type of data structure. The operational data may be collected as a single data set, or may be distributed over different locations including over different storage devices, and may exist, at least partially, as electronic signals on a system or network.

Figure 8:
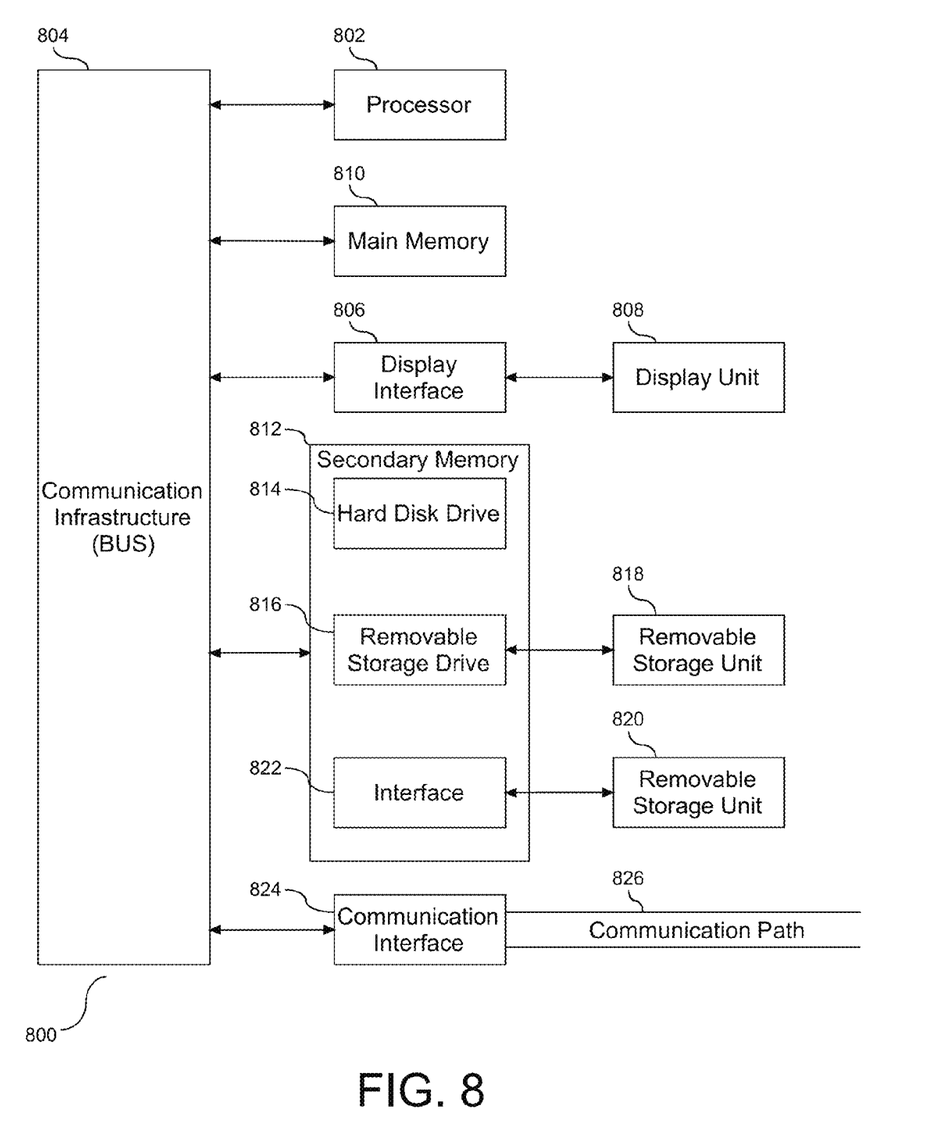
FIG. 8 depicts a block diagram showing a system for implementing an embodiment of the present invention.

Referring now to the block diagram (800) of FIG. 8, additional details are now described with respect to implementing an embodiment of the present invention. The computer system includes one or more processors, such as a processor (802). The processor (802) is connected to a communication infrastructure (804) (e.g., a communications bus, cross-over bar, or network).

The computer system can include a display interface (806) that forwards graphics, text, and other data from the communication infrastructure (804) (or from a frame buffer not shown) for display on a display unit (808). The computer system also includes a main memory (810), preferably random access memory (RAM), and may also include a secondary memory (812). The secondary memory (812) may include, for example, a hard disk drive (814) (or alternative persistent storage device) and/or a removable storage drive (816), representing, for example, a floppy disk drive, a magnetic tape drive, or an optical disk drive. The removable storage drive (816) reads from and/or writes to a removable storage unit (818) in a manner well known to those having ordinary skill in the art. Removable storage unit (818) represents, for example, a floppy disk, a compact disc, a magnetic tape, or an optical disk, etc., which is read by and written to by a removable storage drive (816). As will be appreciated, the removable storage unit (818) includes a computer readable medium having stored therein computer software and/or data.

In alternative embodiments, the secondary memory (812) may include other similar means for allowing computer programs or other instructions to be loaded into the computer system. Such means may include, for example, a removable storage unit (820) and an interface (822). Examples of such means may include a program package and package interface (such as that found in video game devices), a removable memory chip (such as an EPROM, or PROM) and associated socket, and other removable storage units (820) and interfaces (822) which allow software and data to be transferred from the removable storage unit (820) to the computer system.

The computer system may also include a communications interface (824). Communications interface (824) allows software and data to be transferred between the computer system and external devices. Examples of communications interface (824) may include a modem, a network interface (such as an Ethernet card), a communications port, or a PCMCIA slot and card, etc. Software and data transferred via communications interface (824) are in the form of signals which may be, for example, electronic, electromagnetic, optical, or other signals capable of being received by communications interface (824). These signals are provided to communications interface (824) via a communications path (i.e., channel) (826). This communications path (826) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (810) and secondary memory (812), removable storage drive (816), and a hard disk installed in hard disk drive or alternative persistent storage device (814).

Computer programs (also called computer control logic) are stored in main memory (810) and/or secondary memory (812). Computer programs may also be received via a communication interface (824). Such computer programs, when run, enable the computer system to perform the features of the present invention as discussed herein. In particular, the computer programs, when run, enable the processor (802) to perform the features of the computer system. Accordingly, such computer programs represent controllers of the computer system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed.

Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Alternative Embodiment

It will be appreciated that, although specific embodiments of the invention have been described herein for purposes of illustration, various modifications may be made without departing from the spirit and scope of the invention. Specifically, there are multiple way for selecting and moving objects within the hierarchy as represented by the treemap, including using keyboard operations, drag and drop with a pointer, and screen gestures, such as those supported by mobile devices and interactive touch screens. Accordingly, the scope of protection of this invention is limited only by the following claims and their equivalents.

We claim:

1. A computer program product for use with a hierarchy encoded by containment, the computer program product comprising a computer readable storage device having program code embodied therewith, the program code executable by a processor to:
   in a first representation of a hierarchy encoded by containment and visually displayed as a first tree-map, display each object within the first representation as a shape comprising at least two opposing surfaces, wherein the first representation comprises one or more first objects assigned to a first tier in the hierarchy and one or more second objects assigned to a second tier in the hierarchy, and each second object having a second shape boundary nested within a first shape boundary of a first object;
   perform a selection from the group consisting of:
      select a first shape of a first object within the first representation, and designate the selected first shape to the second tier by moving the first shape towards a second boundary of a second shape of the one or more second objects in the second tier, wherein the selection and designation is a single action; and
      select the second shape of the second object within the first representation, and designate the selected second shape to the first tier by moving the second shape outside of the second shape boundary of any second object of the one or more second objects assigned to the second tier, wherein the selection and designation is a single action; and
   create a second representation of the hierarchy visually displayed as a second tree-map in response to the designation, including program code to dynamically re-order the objects of the first representation, wherein the dynamic re-order comprises a re-assignment of the first and second objects within the tiers of the hierarchy.

2. The computer program product of claim 1, wherein the first representation comprises first and second attributes representing tier characteristics of the hierarchy, and wherein the dynamic re-order includes program code to move at least one of the first and second attributes within the hierarchy from a first physical position in the hierarchy to a second physical position in the hierarchy.

3. The computer program product of claim 1, wherein the dynamic re-order of the hierarchy creates a different set of relationships between objects represented in the hierarchy.

4. The computer program product of claim 1, wherein the selection of the shape includes program code to select the two opposing surface boundaries of the shape.

5. The computer program product of claim 1, wherein the selection and designation of the selected shape further comprises program code to support movement of the selected first object, the movement including a direct gestural communication with the selected shape.

6. The computer program product of claim 1, wherein the selection of the second shape includes program code to select the two opposing surface boundaries of the second shape.

7. The computer program product of claim 1, wherein the selection and designation of the selected second shape to the first tier further comprises program code to support movement of the selected second shape, the movement including a direct gestural communication with the selected first shape.

8. The computer program product of claim 1, wherein the dynamic re-order includes an assignment of the first objects to the second tier and the second objects to the first tier.

9. The computer program product of claim 5, wherein the movement of the selected shape comprises a drag of the selected shape.

10. A system comprising:
    a processor in communication with memory;
    a functional unit in communication with the processing unit, the functional unit having tools to manipulate hierarchical data in a first representation of a hierarchy encoded by containment and visually displayed as a first tree-map, wherein each object within the tree-map is displayed as a shape comprising at least two opposing surfaces, wherein the first representation comprises one or more first objects assigned to a first tier of the hierarchy and one or more second objects assigned to a second tier of the hierarchy, each second object having a second shape boundary nested within a first shape boundary of a first object and wherein the tools comprise:
    a selection manager to select a shape of an object within the first representation;
    a designation manager in communication with the selection manager, the designation manager to designate the selected shape to a different tier by moving the selected shape towards boundary of a non-selected shape, wherein the selection and designation of the selected shape to the different tier is a single action; and
    a representation manager in communication with the designation manager, the representation manager to create a second representation of the hierarchy visually displayed as a second tree-map in response to the designation, including the representation manager to dynamically re-order the objects of the first representation wherein the dynamic re-order comprises an assignment of the first objects to the second tier and the second objects to the first tier.

11. The system of claim 10, wherein the first representation comprises first and second attributes representing tier characteristics of the hierarchy, and wherein the dynamic re-order includes the selection manager to move at least one of the first and second attributes within the hierarchy from a first physical position in the hierarchy to a second physical position in the hierarchy.

12. The system of claim 10, wherein the dynamic re-order of the hierarchy creates a different set of relationships between objects represented in the hierarchy.

13. The system of claim 10, wherein the selection of the shape includes the selection manager to select the two opposing surfaces of the shape.

14. The system of claim 10, wherein the selection and designation of the selected shape to the different tier further comprises the designation manager to support movement of the selected first shape, the movement including a direct gestural communication with the selected shape.

15. The system of claim 14, wherein the movement of the selected shape comprises a drag of the selected shape to the different tier.

16. A computer program product for use with a hierarchy encoded by containment, the computer program product comprising a computer readable storage device having program code embodied therewith, the program code executable by a processor to:

in a first representation of a hierarchy encoded by containment and visually displayed as a first tree-map, display each object within the first representation as a shape comprising boundary surfaces, wherein the first representation comprises one or more first objects assigned to a first tier of the hierarchy and one or more second objects assigned to a second tier of the hierarchy, and wherein each second object having a second boundary nested within a first object boundary;

select the shape of the second object of the one or more second objects within the first representation, and designate the selected second object to the first tier by moving the shape of the selected second object to a location outside the boundary of the first object in the first tier, wherein the selection and designation is a single action; and create a second representation of the hierarchy visually displayed as a second tree-map in response to the designation, including program code to dynamically re-order the objects of the first representation, wherein the dynamic re-order comprises a re-assignment of the first and second objects within the tiers of the hierarchy.

17. The computer program product of claim 16, wherein the movement of the selected object comprises a drag of the selected object.

* * * * *